G. DOWNING.
Rock-Drilling Machines.
No. 155,186. Patented Sept. 22, 1874.
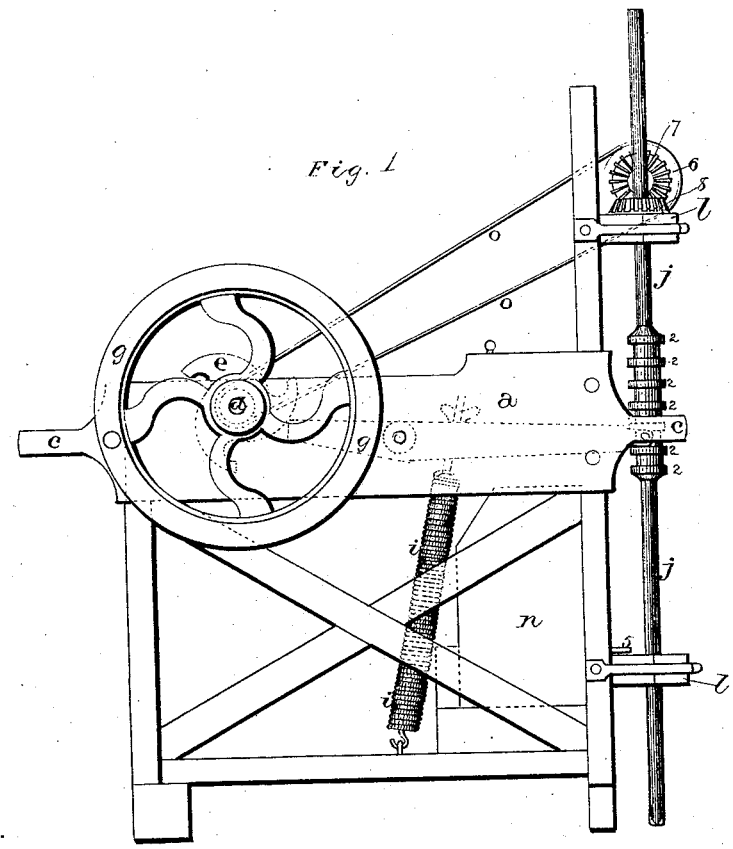
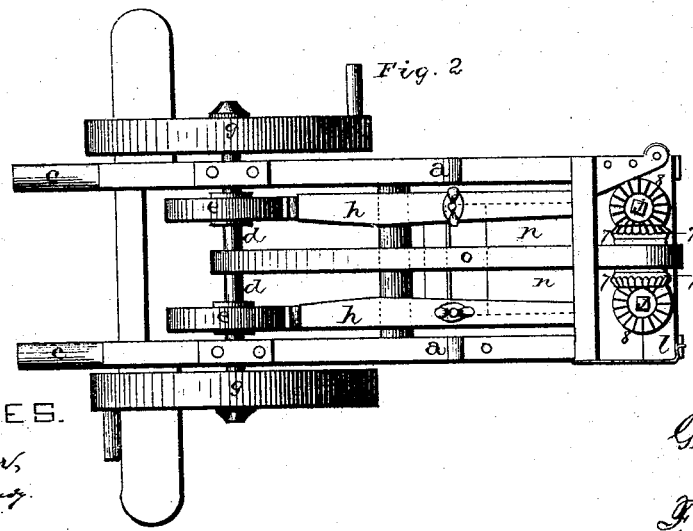
WITNESSES.
J. Wm. Garner,
Frank Clauty
INVENTOR.
Geo. Downing
per
F. A. Lehmann,
Atty.

UNITED STATES PATENT OFFICE.

GEORGE DOWNING, OF SARATOGA, NEW YORK, ASSIGNOR OF ONE-HALF HIS RIGHT TO COLLINS EATON, OF CHICAGO, ILLINOIS.

IMPROVEMENT IN ROCK-DRILLING MACHINES.

Specification forming part of Letters Patent No. 155,186, dated September 22, 1874; application filed August 6, 1874.

*To all whom it may concern:*

Be it known that I, GEO. DOWNING, of Saratoga, in the county of Saratoga and State of New York, have invented certain new and useful Improvements in Stone-Drilling Machines; and I do hereby declare the following to be a full, clear, and exact description of the invention, such as will enable others skilled in the art to which it pertains to make and use it, reference being had to the accompanying drawings, which form part of this specification.

The nature of my invention relates to an improvement in stone-drilling machines; and it consists in combining with the levers for reciprocating the drills a driving belt and gears by which the drills are revolved horizontally around, as will be more fully described hereafter.

The accompanying drawings represent my invention.

$a$ represents a light frame, of any suitable construction, which is provided with handles $c$ at each end, so that it can be readily removed from place to place. Journaled upon the top of this frame is the driving-shaft $d$, to which are secured one or more tappets, $e$, according to the number of drills it is desired to operate, and to one or both ends of shaft is secured a fly-wheel, $g$, by means of which the drills are operated. As the tappets are revolved they depress the rear ends of the pivoted levers $h$, which have forked or bifurcated outer ends, so as to pass around the sides of the drills, and to the under sides of which levers are attached the springs $i$, by means of which the levers are instantly returned to position after having been moved or depressed. Attached to these springs and passing up through the levers is a screw bolt and nut, or any other suitable devices, whereby the tension of the springs and the force of the blows of the drills can be regulated at will. The drills J have a number of collars, 2, formed around them, as shown, between which the studs, projections, or friction-rollers 3 on the inner sides of the pronged ends of the levers $h$ catch, for the purpose of raising the drills up and down. After the drills have bored or cut their holes to a certain depth, and will cut no deeper, the brackets $l$ are opened outward, the drills taken out from between the ends of the levers, and the collars adjusted on the studs 3, so as to cause the drills to cut deeper. Placed inside of the frame is a vessel, $n$, of any suitable shape and size for holding water, and from this vessel project small tubes 5, which keep a stream of water constantly running down the ends of the drills while in operation, so as to keep them cool, to soften the rock being drilled, and spoon out the holes. Passing around the driving-shaft $d$ is a belt, $o$, which passes up over a wheel, 6, journaled upon the top of the upper bracket, which wheel has a beveled pinion or gear, 7, secured to or formed upon each side, which mesh with the beveled wheels 8 placed loosely around the drills, so as to keep the drills constantly revolving while at work.

As the driving-shaft is revolved it gives the drills a vertically-reciprocating motion through the tappets and levers, and at the same time a rotating motion through the belt and beveled gears.

Though the devices here shown and described are represented as being used in a portable drill and operated by hand, they are equally applicable to drills of a larger size, to be driven by steam or water power.

Having thus described my invention, I claim—

In combination with the tappets $e$, shaft $d$, and levers $h$, the driving-belt $o$ and gears 7 8, substantially as shown and described.

GEORGE DOWNING.

Witnesses:
E. A. WEST,
O. W. BOND.